US011954102B1

(12) United States Patent
Palaniappan et al.

(10) Patent No.: US 11,954,102 B1
(45) Date of Patent: Apr. 9, 2024

(54) STRUCTURED QUERY LANGUAGE QUERY EXECUTION USING NATURAL LANGUAGE AND RELATED TECHNIQUES

(71) Applicant: INTUIT INC., Mountain View, CA (US)

(72) Inventors: Rama Palaniappan, San Diego, CA (US); Aditi Rajawat, Union City, CA (US); Estanislau Auge-Pujadas, San Mateo, CA (US)

(73) Assignee: Intuit Inc., Mountain View, CA (US)

( * ) Notice: Subject to any disclaimer, the term of this patent is extended or adjusted under 35 U.S.C. 154(b) by 0 days.

(21) Appl. No.: 18/361,988

(22) Filed: Jul. 31, 2023

(51) Int. Cl.
*G06F 16/2452* (2019.01)
*G06F 16/22* (2019.01)
*G06F 16/25* (2019.01)

(52) U.S. Cl.
CPC .... *G06F 16/24522* (2019.01); *G06F 16/2237* (2019.01); *G06F 16/252* (2019.01)

(58) Field of Classification Search
CPC ........... G06F 16/24522; G06F 16/2237; G06F 16/252
See application file for complete search history.

(56) References Cited

U.S. PATENT DOCUMENTS

| | | | | |
|---|---|---|---|---|
| 11,531,651 B1* | 12/2022 | Markley | ................ | G06F 16/211 |
| 2017/0141791 A1* | 5/2017 | Balegar | ................ | H03M 7/3079 |
| 2023/0252233 A1* | 8/2023 | Gutierrez | ................ | G06F 40/20 |
| | | | | 704/9 |

* cited by examiner

*Primary Examiner* — Albert M Phillips, III
(74) *Attorney, Agent, or Firm* — Patterson + Sheridan, LLP

(57) ABSTRACT

Certain aspects of the present disclosure provide techniques for executing structured query language queries having a schema associated therewith against an application programming interface using natural language. The schema can be chunked such that embeddings of the resulting chunks are stored in a vector store. Schemas (or subschemas) generated using on or more chunks of the vector store may be provided to a large language model along with a NL query to generate a structured query language query which may be executed against the application programming interface. This allows large language models to produce structured query language queries, such as GraphQL queries even if a GraphQL schema is too large to be provided to the model as context. Aspects disclosed herein also provide techniques for client code generation and client software development kit generation.

20 Claims, 9 Drawing Sheets

STRUCTURED QUERY LANGUAGE QUERY EXECUTION USING NATURAL LANGUAGE AND RELATED TECHNIQUES

INTRODUCTION

Aspects of the present disclosure relate to using natural language input to generate and execute structured query language queries by using a language model to generate structured query language queries based on the natural language input and based on a schema context that was generated from embeddings of a chunked structured query language application programming interface (API) schema.

BACKGROUND

Large language models, in general, use tokenization on both training data and on input used by the model to generate output. However, large language models ("LLM"s) are also expensive to operate and train. They may require extensive computational resources, including specialized hardware like graphics processing units and/or tensor processing units that use large-scale distributed training setups. Generally, such training setups are not in the possession of end users. Rather, models are generally trained in advance using these networks and made available to end users. Such models are typically utilized by a computing device of an end user by making application programming interface ("API") calls to the model host to interact with the model. LLMs may be used to generate responses to natural language queries, and can do so based on a context provided to the model.

For models using versions of generative pre-trained transformer ("GPT") models, such as OpenAI's ChatGPT, or other versions, there are limitations on the number of tokens (2048 and 4096 tokens respectively for GPT-3 and GPT-3.5, for example) which the model can accept. This can prevent such models from being usable with systems or with schemas for which the number of tokens exceeds the limitation. For example, a schema for a structured query language such as GraphQL may have a number of nodes which exceeds the token limit by many times, preventing use of the schema as a context for an LLM. For models accessible to an end-user, there may be restrictions on the input size, token size, output size, processing time allowed, or other limitations.

In particular, for GraphQL APIs, schemas can be too large to be provided as contexts to a language model. Rather, the number of tokens needed to represent a GraphQL schema can be many times the maximum token limit of an LLM. Thus, queries using the full schema cannot be performed, prohibiting LLMs from generating GraphQL queries. Further, training large-scale language models with a high number of tokens creates challenges related to memory limitations, processing power, and training time. Training or fine-tuning large language models is particularly problematic when the tokens of a system are frequently changing, such as may be the case for GraphQL. When tokens are frequently changing, training an LLM becomes further prohibitively expensive or time-consuming because of the requirement of using current tokens despite the constant change. Therefore, traditional large language model training and use cannot accept the number of tokens required for a large schema.

Accordingly, techniques are needed that fix, improve, or address the limitations on token count and context size for using GPT to respond to certain queries.

BRIEF SUMMARY

Certain embodiments provide a computer-implemented method for structured query language query execution using natural language and related techniques. Embodiments also provide a method of executing a structured query language query, comprising: receiving a structured query language schema executable against an application programming interface; chunking the structured query language schema into a plurality of subschemas; creating a plurality of embeddings for the plurality of subschemas; storing the plurality of embeddings in a vector store; receiving a NL query; selecting at least one embedding related to the NL query from the vector store; defining a subschema from the at least one embedding; generating, using a large language model trained to generate structured query language queries based on natural language input and an input schema, the structured query language query based on the NL query and the subschema; and executing the structured query language query against the application programming interface.

Other embodiments provide processing systems configured to perform the aforementioned methods as well as those described herein; non-transitory, computer-readable media comprising instructions that, when executed by one or more processors of a processing system, cause the processing system to perform the aforementioned methods as well as those described herein; a computer program product embodied on a computer readable storage medium comprising code for performing the aforementioned methods as well as those further described herein; and a processing system comprising means for performing the aforementioned methods as well as those further described herein.

The following description and the related drawings set forth in detail certain illustrative features of one or more embodiments.

BRIEF DESCRIPTION OF THE DRAWINGS

The appended figures depict certain aspects of the one or more embodiments and are therefore not to be considered limiting of the scope of this disclosure.

To facilitate understanding, identical reference numerals have been used, where possible, to designate identical elements that are common to the drawings. It is contemplated that elements and features of one embodiment may be beneficially incorporated in other embodiments without further recitation.

DETAILED DESCRIPTION

Application development using structured query languages such as GraphQL can be a complicated and time consuming process. Determining the needed query for a particular purpose can be difficult, and generating a client software development kit ("SDK") can be even more challenging. Generative artificial intelligence (AI) can be applied to query and client SDK generation to improve the speed and accuracy of query generation and client SDK creation. However, use of generative AI has limits related to a maximum token limit for training, as well as maximum input and output sizes and other limitations.

Aspects of the present disclosure provide techniques for enabling generative AI to be used in conjunction with GraphQL or other structured query languages for which current limitations of generative AI create similar challenges. An agent can be used to interact with and interconnect a generative AI language model to a query generator, a query executor, a client SDK generator, an artifact repository, etc. The generative AI language model can be used to determine a next step associated with executing a natural languave (NL) query and can process outputs from a previous step to generate inputs for the next step.

Features disclosed herein enable a user to perform structured query language query generation, query execution, client source code generation, and client SDK creation using natural language and without any prerequisite knowledge of the structured query language, schema definition language ("SDL"), client coding, or SDK creation. This is achieved, at least in part, by using chunking on a structured query language schema to create vectorized embeddings of the schema that are stored in a vector store. A structured query language subschema can be generated from the embeddings based on a natural language input. In various cases, the subschema can be used with a language model where a traditional schema would otherwise be prohibitively large due to limitations of the model. Thus, embodiments of the present disclosure overcome the technical problem presented by maximum token limits for training many generative AI language models, as well as maximum input and output sizes and other limitations of such generative AI language models through a particular technical solution that involves generating a structured query language subschema from embeddings of a structured query language schema. As such, techniques described herein allow a computing system to do something that it could not do before, by allowing a generative AI language model to be used for generation and execution of structured query language queries, client source code generation, and client SDK creation using natural language even when the generative AI language model has token, input, and/or output limits that are incompatible with a size of a schema for the structured query language.

Figure 1:
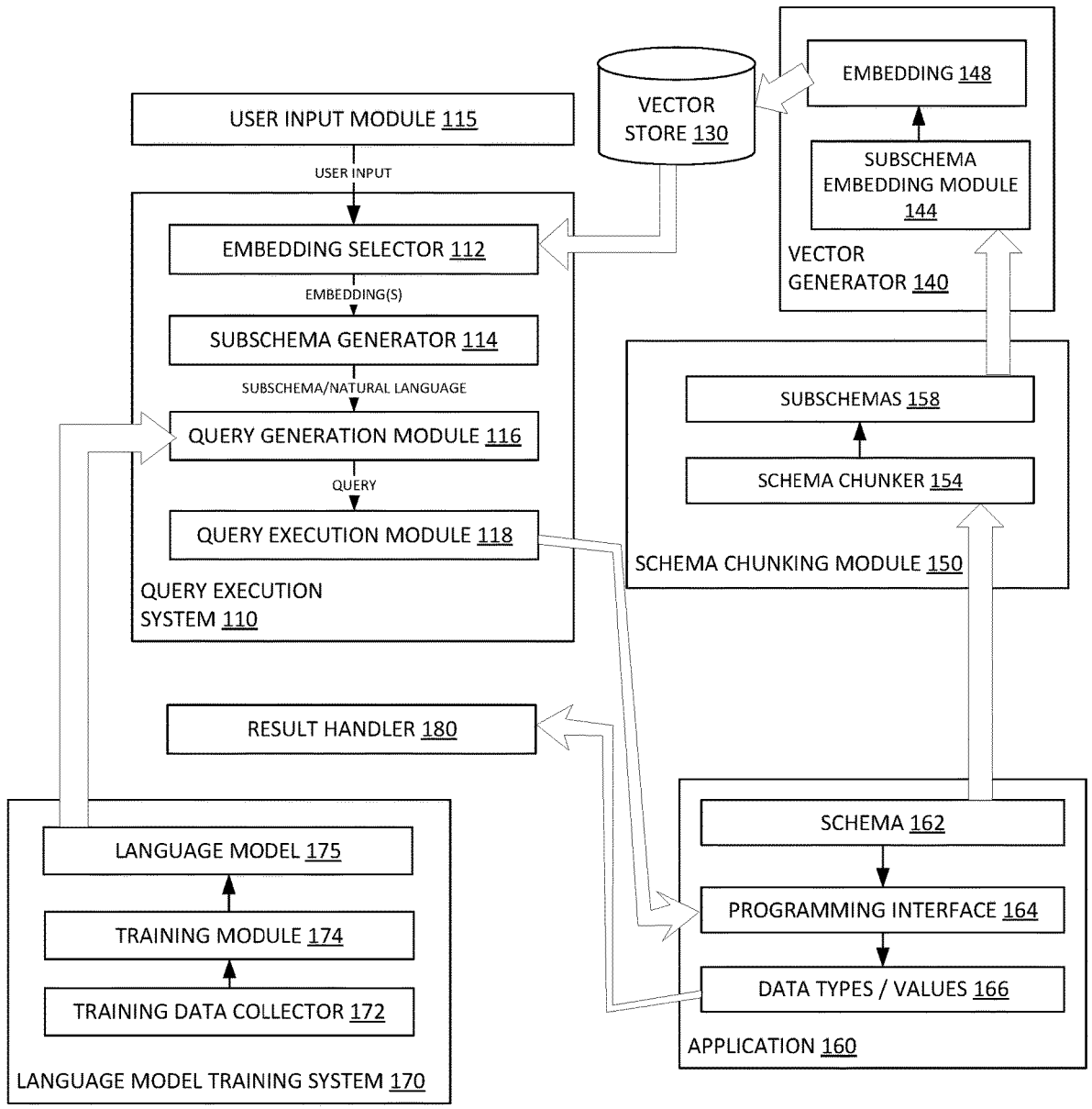
FIG. 1 illustrates an example computing environment in which a structured query language query is executed using natural language (NL), according to embodiments.

Example Computing Environment for Executing a Structured Query Language Query Using Natural Language FIG. 1 illustrates an example computing environment 100 in which a structured query language (GraphQL) query is executed using natural language. It is noted that, while some embodiments are described herein with respect to GraphQL specifically, techniques described herein may be used with other structured query languages. As illustrated, computing environment 100 includes a query execution system 110, a user input module 115, a vector store 130, a vector generator 140, a schema chunking module 150, an application 160, a language model training system 170, and a result handler 180.

As shown, the query execution system includes an embedding selector 112, a sub schema generator 114, a query generation module 116, and a query execution module 118. A user input module 115 receives user input, such as natural language input, from a user and provides the input to the embedding selector 112 of the query execution system 110.

The embedding selector selects and receives one or more embeddings from the vector 130 for the input received by the user input module 115. Based on the selected embeddings, the subschema generator generates a subschema. Each embedding selected from the vector store may include a series of interconnected nodes of a directed acyclic graph (DAG). A sub schema for a natural language input from the user can be generated by traversing the nodes of the selected embedding(s). The subschema and natural language input can be provided to the query generation module 116.

Using a language model 175, the query generation module 116 generates a structured query language query based on the natural language user input and using the generated subschema as a context. The generated query can then be provided to the query execution module 118 which executes the structured query language query, such as by using a structured query language API client to interact with a structured query language programming interface 164 of an application 160. The programming interface 164 is defined by a schema 162 of the application which defines data types and values 166 accessible by the query execution module 118 via the programming interface 164.

The data types and values 166 can be received by a result handler 180. In various embodiments, the result handler may be a separate module or may be included in the query execution system 110.

The embeddings of the vector store 130 are generated by a vector generator 140. The vector generator 140 receives a subschema at a subschema embedding module 144. The subschema embedding module 144 generates vector embeddings, such as vector embedding 148 for subschemas and stores them in vector store 130.

The sub schemas are received by the sub schema embedding module 144 of the vector generator 140 from a schema chunking module 150. The schema chunking module 150 receives a schema, such as a structured query language schema for an application having a structured query language API, and breaks the schema into chunks using a schema chunker 154 of the schema chunking module 150. The schema chunker 154 breaks the schema into subschemas 158. The subschemas 158 are then provided by the schema chunking module 150 to the subschema embedding module 144 of the vector generator 140.

In the example of FIG. 1, the language model 175 of the language model training system 170 is trained using a training module 174 which trains a language model to output a GraphQL query using natural language input and based on an input schema. The language model 175 may be trained using data collected by a training data collector 172. The training data collector 172 provided the training data to a training module 174 which may train or fine tune a large language model, such as language model 175 to generate structured query language queries based on natural language input and based on a schema (or subschema) used as context.

The training data may be tokenized, and parameters associated with the tokens, such as various attribute encodings, positional encodings, token affinities, and/or token context may be adjusted to improve accuracy of the model. For instance, the adjusting of parameters of the model may be based on evaluating an objective function (e.g., a cost function or loss function) for optimizing one or more variables (e.g., model accuracy). In some embodiments, one or more variables of such an objective function may relate to whether the outputs produced by the model based on the training inputs match the known labels associated with the training inputs or whether a measure of error between training iterations is not decreasing or not decreasing more than a threshold amount. The conditions may also include whether a training iteration limit has been reached. Parameters adjusted during training may include, for example, hyperparameters, values related to numbers of iterations, weights, functions used by nodes in a neural network to calculate scores, and the like.

Increasing the number of tokens for training greatly increases cost and resource consumption. Further, large schemas are represented by a large number of tokens, and, in some cases, token context may be indeterminable where a schema context is prohibitively large and exceeds a maximum limitation for the training system 170. For this and other reasons, a schema may be chunked or split, as described below.

Example Method for Splitting an Application Schema into Subschemas

Figure 2:
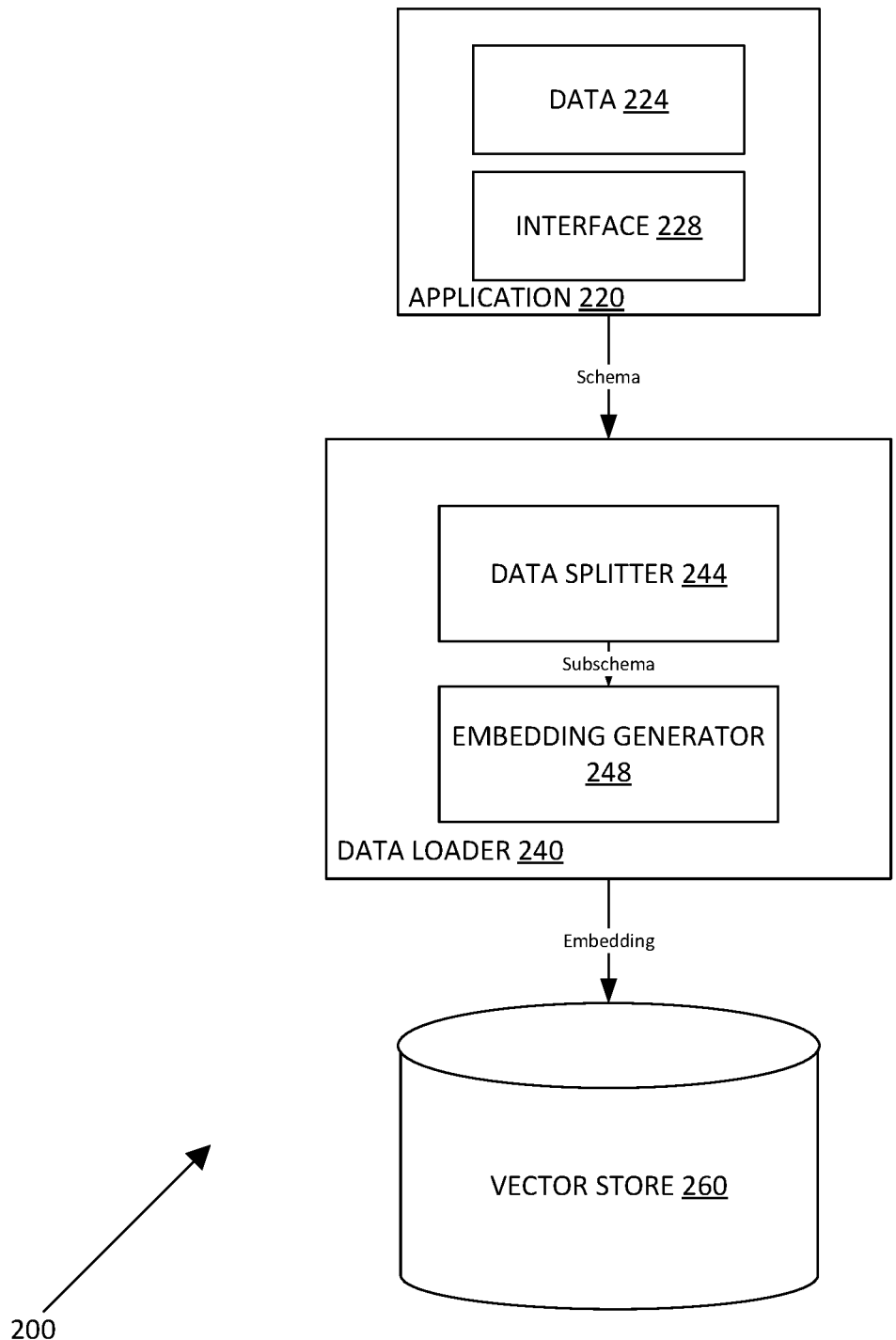
FIG. 2 illustrates an example method in which a schema for an application is split into subschema for generating vector store embeddings, according to embodiments.

FIG. 2 illustrates an example method 200 method in which a schema for an application is split into subschema for generating vector store embeddings. In general, a schema may be expressed in a machine-readable schema definition language ("SDL") and defines the structure and capabilities of an API. In other words, a schema defines the available data types usable and operations that can be performed with the API.

GraphQL queries are generally written using the GraphQL SDL, which provides a concise way to define types and fields as well as operations such as queries, mutations, etc. Additionally, GraphQL schemas can include additional instructions or metadata about certain aspects of the schema, such as for caching or authentication. Use of schemas allows clients to request the data they need using an API, thus reducing over-fetching and under-fetching of data compared to traditional representational state transfer ("REST") APIs. However, a GraphQL schema may include a number of nodes that exceeds a token limit for an LLM. To work around such a restriction, a GraphQL schema (or other type of structured query language schema) may be processed using chunking as follows to generate a schema (or subschema) usable as a context with an LLM.

In the example shown, a splitting system 200 includes an application 220, a data loader 240, and a vector store 260.

The application 220 includes data 224 and an interface 228. In some cases, a query to the application via the interface may require that the query comply with a schema for the application programming interface. Data 224 is associated with types included in the application schema which may be accessed by an external computing device using an API call.

The data loader 240 includes a data splitter 244 and an embedding generator 248. The data loader 240 receives a schema for the application 220 and splits the schema into subschemas. In general a schema can be defined according to one or more sentences of an SDL. Subschemas can be generated by parsing the sentences of the SDL definition of the schema and partitioning the sentences into one or more groups of SDL sentences. The number of chunks needed may be determined by the relative size of the schema to be chunked and the maximum token limit of the selected language model. By way of example, a contemporary ecosystem of multiple applications may have a GraphQL schema associated with an API for the applications that can be many times larger than a token limit of an LLM. In such an example, for a suite of tens of applications, hundreds of chunks or more may be needed. In one example, a large schema for a programing interface of a suite of applications is chunked into 157 chunks for generating 157 embeddings that are stored in a vector store.

In various embodiments, chunking may be performed by internal logic of the splitter 244. The internal logic may perform chunking, or splitting of in input schema using a text splitter and based on selected delimiters. For example, an input schema can be split every time a delimiter appears, every other time a delimiter appears, or based on a delimiter appearing any other number of times. In embodiments, chunking can be performed according to types and/or fields associated with the schema. Alternatively, chunking may be at random rather than deterministic, or may be according to a random selection of types, fields, or delimiters.

In an example, a schema for a collection of applications includes delimiters. The example schema may be many times larger than a maximum size for input schema for use as context for a language model. A number of needed chunks may be determined based on the maximum input size of the model. Continuing the example, it may be determined that at least 100 chunks are needed by comparing the example schema to the maximum input size for a schema used as context for a language model. In the example, the splitter divides the schema using the delimiters to create a number of chunks greater than the minimum number of chunks needed. This may be done by defining chunks according to a number of delimiters. For example, a chunk can be defined as the portion of the example schema between some number of delimiters. If more than 100 chunks are required, the total number of delimiters can be divided by 100, and a number less than the result can be selected to determine the size of the chunks. As noted, chunking can also be performed without using delimiters in this way. For example chunking can be performed according to types or fields, or at random, such as by selecting delimiters at random to define chunks, or according to other attributes of the schema.

The chunks may be passed to an embedding generator 248 which generates vector embeddings for the chunks generated by the data splitter 244. In the example shown, the vector embeddings generated by the generator 248 of the data loader 240 can be stored in the vector store 260.

Example Method of Generating a Structured Query Language Query

Figure 3:
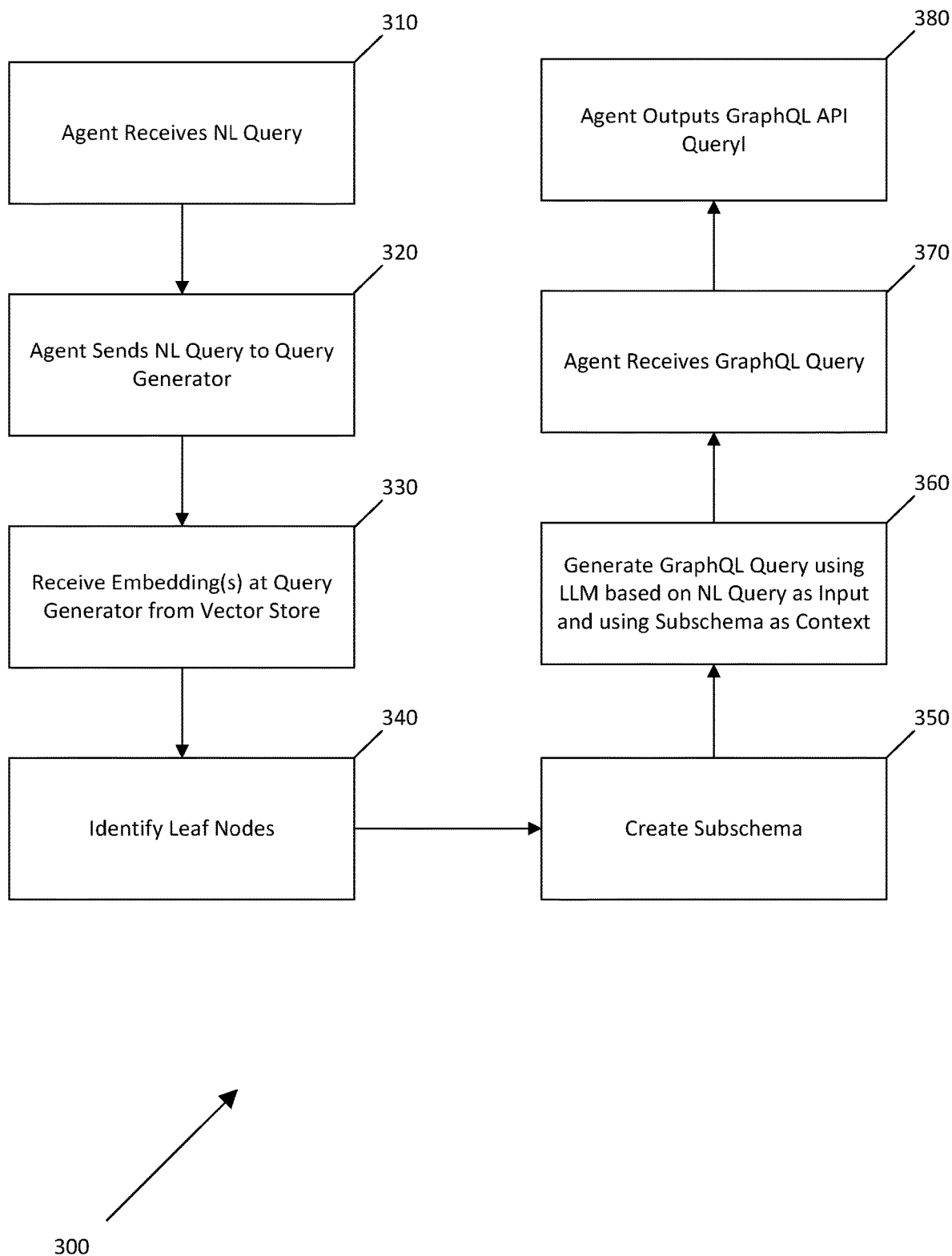
FIG. 3 illustrates an example method of generating a structured query language query, according to embodiments.

FIG. 3 illustrates an example method 300 in which a structured query language query such as a GraphQL Query is generated. As shown, the method 300 begins and proceeds to stage 310 where an agent receives a natural language ("NL") query. The query may be input by a user using an input of a computing device. The query may be natural language, but is not limited to only natural language and could include other input.

The method 300 may then proceed to stage 320 where the agent sends the NL query to a query generator. The query generator receives the NL query as input and requests, from a vector store, embeddings related to NL query.

The method 300 may then proceed to stage 330 where one or more embeddings are received at the query generator from the vector store. In a particular example, a schema related to a GraphQL API associated with the NL query has been split into 157 chunks for which embeddings have been generated and stored in a vector store. In the example, four embeddings are received from the vector store. In various embodiments, the number of chunks for the schema and the number of retrieved embeddings may be less or greater.

Next, the method 300 proceeds to stage 340 where leaf nodes are identified. The one or more embeddings received at stage 330 correspond to a traversal path of the vector store. Each traversal path includes one or more nodes, which may be arranged in a directed acyclic graph (a "DAG"). For one or more traversal paths, a node furthest from a root node may be considered a leaf node. Data identifying leaf nodes may be included in each embedding allowing identification of leaf nodes associated with embeddings. Continuing the example, the leaf nodes may be the leaf nodes of the four embeddings retrieved from the vector store.

From stage 340 where the leaf nodes are identified, the method 300 may proceed to stage 350 where a subschema is created. The subschema can be created by determining the nodes along the traversal path of a root node of the vector store to the leaf nodes identified at stage 340. The DAG resulting from the totality of nodes along the traversal paths from the root to the leaf nodes may represent a subschema generated from the embeddings related to the NL query.

Next, the method 300 may proceed to stage 360 where a GraphQL query is generated using a large language model ("LLM") based on the NL query as input and using the subschema as a context. In general, an LLM may be trained to recommend a GraphQL query as a result based on language input into the model and based on using a schema as context. In this case, the schema used as context is the subschema created at stage 350 and the language input is the NL query received by the agent at stage 310.

The method 300 may then proceed to stage 370 where the agent receives the GraphQL query. In one example, the following query can be received by the agent in response to the NL input "list all country names and its flag in the continent of South America":

```
query {
    continent(code: "SA") {
        name
        countries {
            name
            emoji
        }
    }
}
```

Next, the method 300 proceeds to stage 380 where the agent outputs the GraphQL API query. In general, the query must adhere to an API schema or else the query may fail. Once the agent has output the GraphQL query, such as by displaying the query to a user or sending the query to another device, the method 300 may conclude.

Example Method of Executing a Structured Query Language Query

Figure 4:
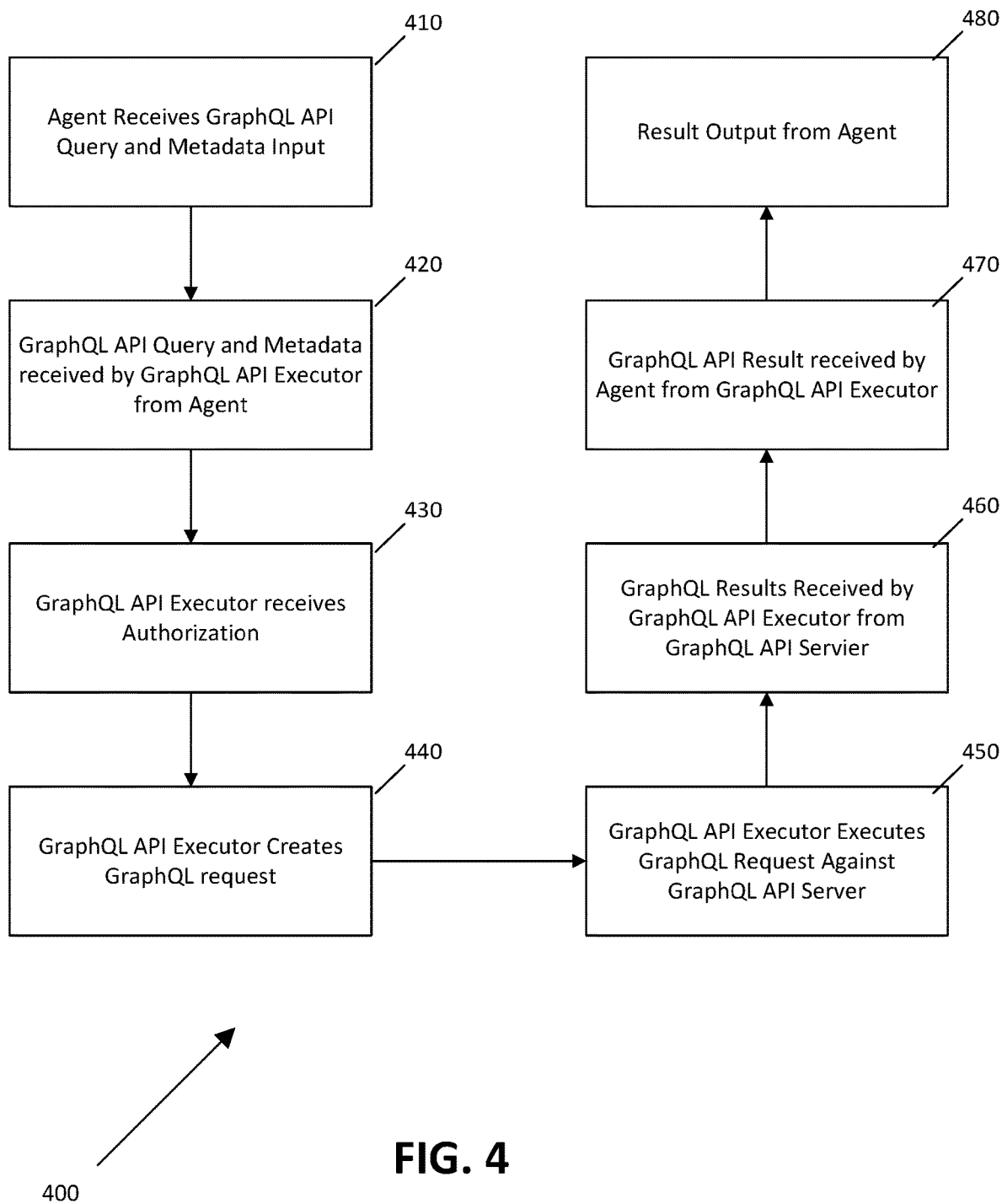
FIG. 4 illustrates an example method of executing a structured query language API, according to embodiments.

FIG. 4 illustrates an example method 400 in which a structured query language query such as a GraphQL query is executed. In various embodiments, the GraphQL query is executed by a GraphQL API Executor Tool. The Graph API Executor tool can be used by an agent or controller to execute GraphQL queries against an application's GraphQL API server In the example shown, the method 400 begins and proceeds to stage 410 where an agent receives a GraphQL query and metadata input. In one example, the GraphQL query can comprise the following:

```
query {
    continent(code: "SA") {
        name
        countries
            name
            emoji
        }
    }
}
```

From stage 410 where the GraphQL query and metadata input are received by the agent, the method 400 may proceed to stage 420 where the GraphQL Query and metadata input are received by a GraphQL API executor from the agent. The executor can perform various functions, such as executing the GraphQL Query against a GraphQL API server, performing authorization functions to authorize the agent for the GraphQL query, wrapping a GraphQL API request or URL with appropriate metadata, such as HTTP metadata, etc.

Next, the method 400 may proceed to stage 430 the GraphQL executor receives authorization. For example, the agent can be determined to be authenticated or authorized based on having metadata indicating authorization included with the request.

From stage 430 where the executor receives the authorization, the method 400 may proceed to stage 440 where the GraphQL API executor creates a GraphQL request. Next, the method 400 may proceed to stage 450 where the GraphQL executor executes the GraphQL request against a GraphQL API server.

Once the GraphQL executor executes the GraphQL request, the method 400 may proceed to stage 460 where GraphQL results are received by the GraphQL API executor from the GraphQL API server.

Next, the method 400 may proceed to stage 470 where the GraphQL result is received by the agent from the GraphQL executor. In one example, the GraphQL query result can comprise the following:

```
{
    "data":{
        "continent":{
            "name":"South America",
            "countries":[
                {
                    "name":"Argentina",
                    "emoji":"..."
                },
                ...
            ]
        }
    }
}
```

Once the GraphQL result is received at stage 470, the method 400 can proceed to stage 480 where the result is output from the agent. For example, a user device may display or otherwise output the result to a user. The method 400 may then conclude after the result has been output.

Example Method of Generating a Structured Query Language Client

Figure 5:
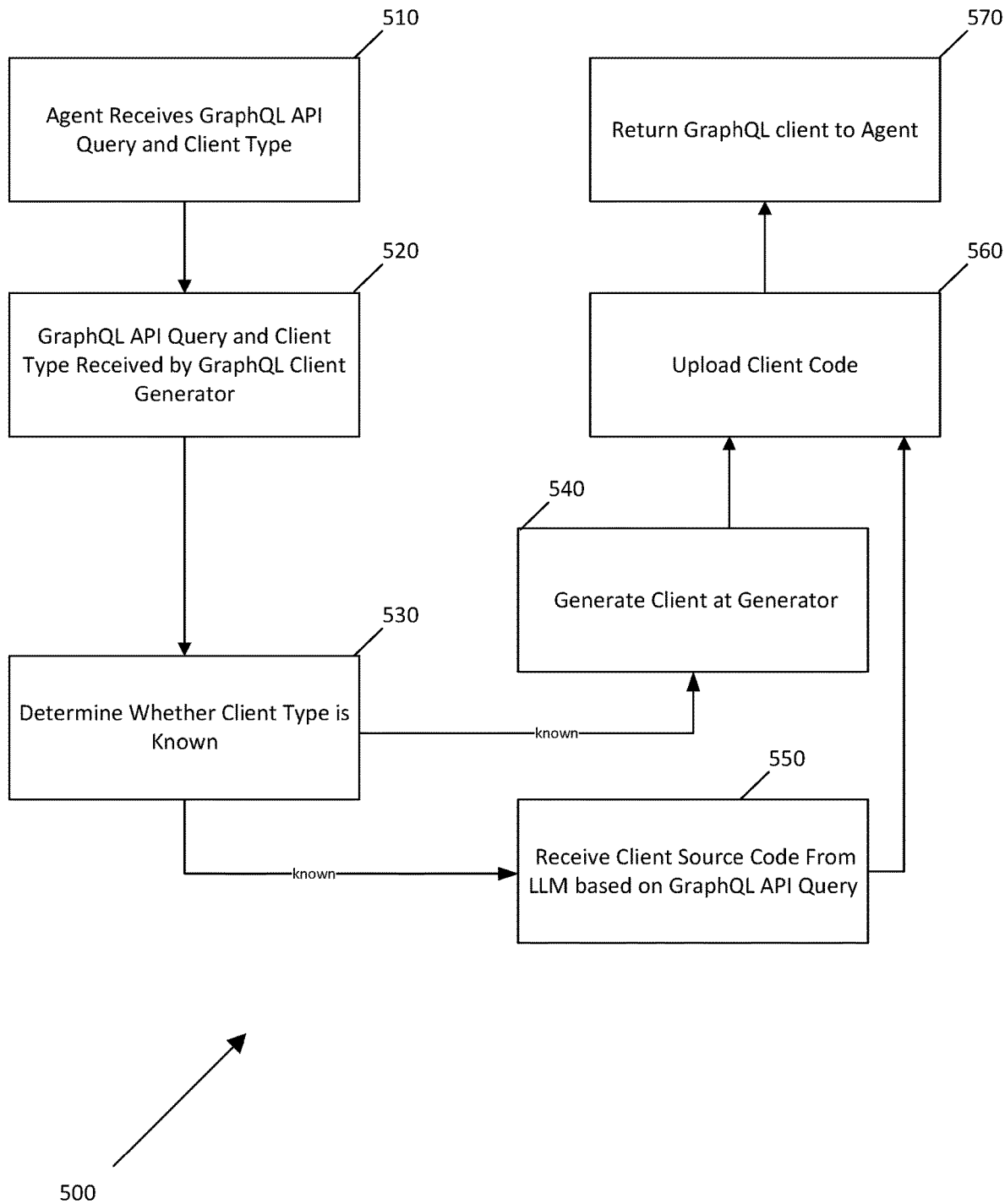
FIG. 5 illustrates an example method of generating a structured query language client, according to embodiments.

FIG. 5 illustrates an example method 500 in which a structured query language client such as a GraphQL client is generated. As shown, the method 500 begins and proceeds to stage 510 where an agent or controller receives a GraphQL API query and client type. Various clients of different types may have different GraphQL APIs associated with the client type. A type can be included with the GraphQL API query received by the controller. In one example, the GraphQL API query and client type may be as follows:

```
QUERY="query {
    continent(code: "SA") {
        name
        countries {
            name
            emoji
        }
    }
}"
CLIENT_TPYE=curl
```

From stage 510, the method 500 may proceed to stage 520 where the GraphQL API query and client type are received by a GraphQL client generator. The GraphQL client generated can be used to generate a GraphQL API client for the client type received by the agent as follows.

The method 500 next proceeds to stage 530 where it is determined whether the client type is a known client type. If the client type is known, the method 500 may proceed to stage 540 where a GraphQL API client is generated for the known client type. From stage 540, the method 500 may proceed to stage 560 where the client code is uploaded.

If the client type is unknown, the method 500 may proceed to stage 550 where client source code from a large language model is received based on the GraphQL API query. For example, a LLM can be used to generate the client source code by injecting the input query into a prompt template to generate the client source code.

From stage 550, the method 500 may proceed to stage 560 where the client code is uploaded. In various embodiments, the client code may be uploaded to a location accessible via a URL. In some cases, client code may also be uploaded to an artifact store, or client code or binary of an artifact store can be updated based on the client source code received from the LLM.

From stage 560 where the client code is uploaded, the method 500 may proceed to stage 570 where the GraphQL client is returned to the agent. For example, a URL can be returned to the agent or controller and provided to a user of a computing device used to access the agent or controller. The method 500 may then conclude once the user receives the URL.

Figure 6:
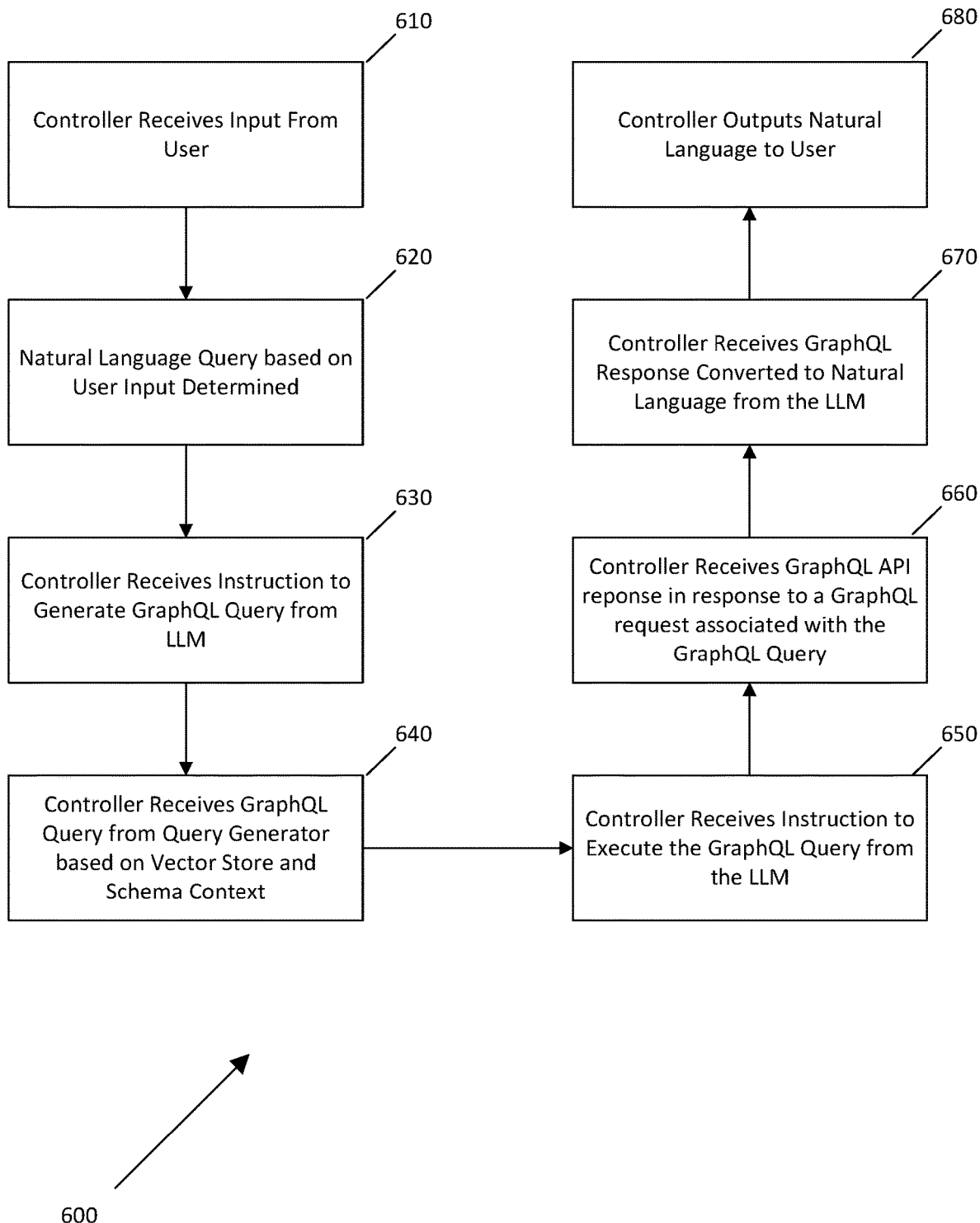
FIG. 6 illustrates an example method of generating a result of a structured query language API using a NL query, according to embodiments.

Example Method of Generating a Result of a Structured Query Language API Using Natural Language FIG. 6 illustrates an example method 600 in which a result of a structured query language (e.g., GraphQL) API is generated using natural language. In the example of FIG. 6 the method 600 begins and proceed to stage 610 where a controller receives input from the user. An agent or controller can be accessed by a user inputting the natural language using a user computing device via a networked connection. By way of example, an input might be "can you list all country names and its flag in the continent of South America."

The method 600 may then proceed to stage 620 where a NL query based on the user input is determined. For example, for the input "can you list all country names and its flag in the continent of South America," the NL query can be "list all country names and its flag in the continent of South America."

Next, the method 600 may proceed to stage 630 where the controller receives an instruction to generate a GraphQL query from a large language model. The input from the user may be passed to a large language model such that the model generates an instruction in response to the input being received from the controller. From the NL input, the LLM may determine an action, a tool, and a tool input, and the instruction may comprise performing the action using the tool and tool input. Continuing the example, the action may be a conversion from NL to a GraphQL query, the tool selected may be a GraphQL Query Generation Tool, and the tool input can be the NL query.

Next, the method 600 proceeds to stage 640 where the controller receives a GraphQL query from a query generator. In various embodiments, the GraphQL query can be generated by the query generator using an LLM and based on the NL input or NL query and a schema context determined from content of a vector store related to the application interface against which the query is to be executed. The schema may be determined by selecting embeddings from the vector store related to the NL input and aggregating nodes of the embeddings to generate a sub schema to be used as the schema.

Next, the method 600 may proceed to stage 650 where the controller receives an instruction to execute the GraphQL query from the large language model. In the example, the GraphQL query received from the query generator is passed to the large language model, and the large language model generates a response including an instruction to execute the GraphQL query. For example, the LLM may determine that the next action is to execute the query, a needed tool is a GraphQL API Execution Tool, and the tool input is the GraphQL query received by the controller at stage 640.

The method 600 may then proceed to stage 660 where the controller receives a GraphQL API response in response to a GraphQL request associated with the GraphQL query. The response may be in a GraphQL response format which may not be easily readable by a user. For example, the below response may be received in response to the following query:

```
"query {
    continent(code: "SA) {
        name
        countries
            name
            emoji
        }
    }
}"
```

-continued

```
response {
  "data": {
    "continent": {
      "name":"South America",
      "countries":[
        {
          "name":"Argentina",
          "emoji":" ... " },
          , ... , ... ] }
      }
    }
```

The method 600 may then proceed to stage 670 where the controller receives a natural language conversion of the GraphQL response. The GraphQL response can be provided to a large language model which can provide a natural language conversion of the GraphQL response that is understandable in natural language to a user. For example, the following natural language may be received in response to the above GraphQL response being input into the LLM: "The countries in South America are: Argentina <flag>, . . . " Where each country in South America is listed along with an image of each respective country's flag.

Next, the method 600 may proceed to stage 680 where the controller outputs the natural language to the user. In some cases, the user may input a NL query, which can be executed as a GraphQL query against a GraphQL API, and receive results in natural language. In this way, natural language input can be used to generate natural language output using results converted from a response of executing a GraphQL schema. Once the natural language is output to the user at stage 680, the method 600 may conclude.

Figure 7:
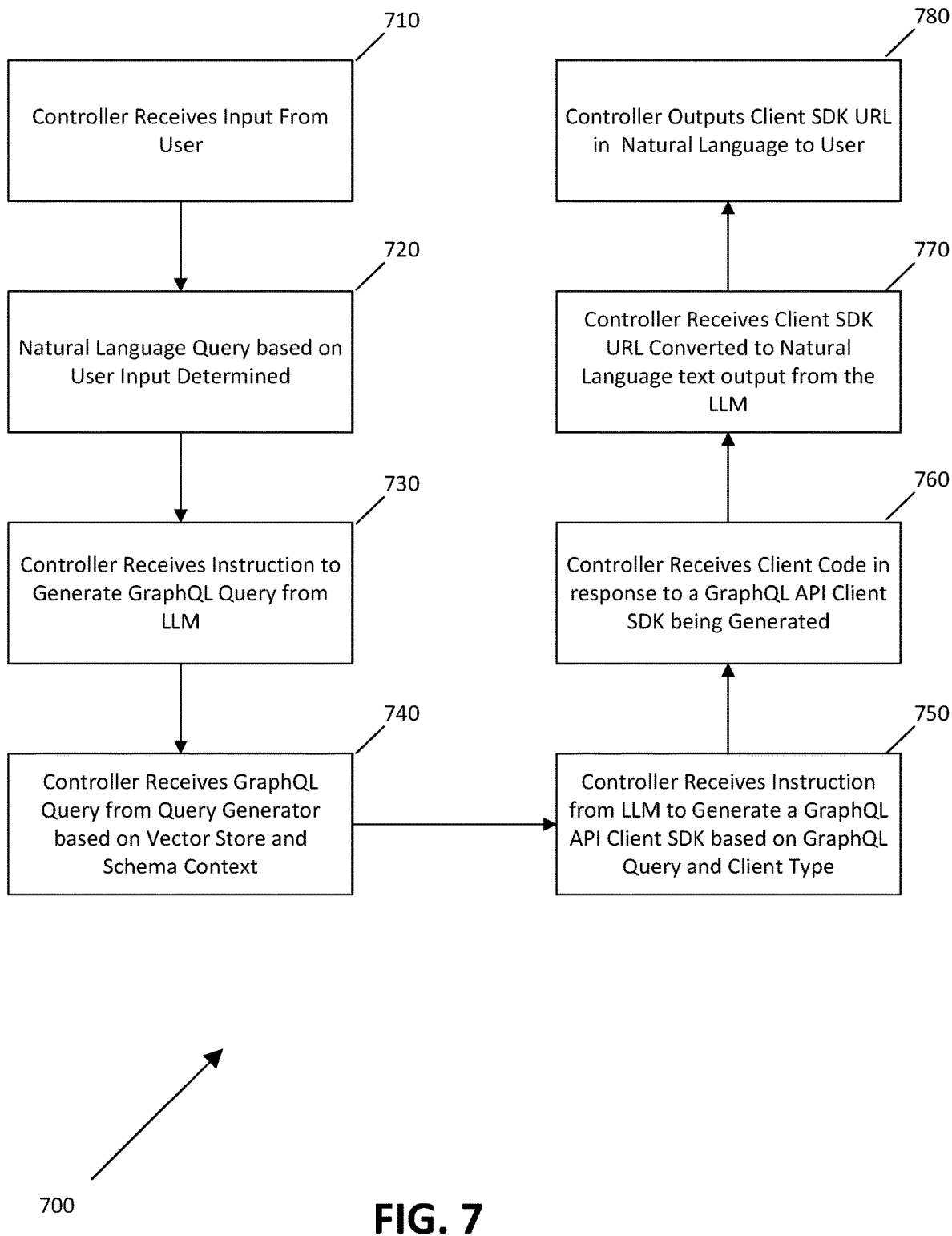
FIG. 7 illustrates an example method of generating a client software development kit ("SDK") for a structured query language API using a NL query, according to embodiments.

Example Method of Generating a Client SDK for a Structured Query Language API Using Natural Language FIG. 7 illustrates an example method 700 in which a client SDK for a structured query language (e.g., GraphQL) API is generated using natural language. The method 700 of FIG. 7 may be similar to the method 600 of FIG. 6 except that a GraphQL API client SDK is generated based on a query and client type instead of a GraphQL query being executed.

In the example of FIG. 7, the method 700 begins and proceed to stage 710 where a controller receives input from the user. In one example, the input comprises the following: "Can you generate a GraphQL client in 'java 11 with Netflix DGS Client' to list all country names and its flag in the continent of South America" In this example, the query is "list all country names and its flag in the continent of South America" and the client type is "java 11 with Netflix DGS."

The method 700 may then proceed to stage 720 where a NL query based on the user input is determined. Continuing the example, for the user input "Can you generate a GraphQL client in 'java 11 with Netflix DGS Client' to list all country names and its flag in the continent of South America" the NL query can be determined to be "list all country names and its flag in the continent of South America."

Next, the method 700 may proceed to stage 730 where the controller receives an instruction to generate a GraphQL query from a large language model. The input from the user is passed to the large language model, and the model determines that a GraphQL query associated with the input needs to be generated and generates an instruction to generate the GraphQL query in response to receiving the input from the controller. For example, the LLM may determine a next action as converting NL into a GraphQL query, with a GraphQL Query Generation Tool as the tool for the next action, and the NL query as input into the GraphQL Query Generation Tool.

Next, the method 700 proceeds to stage 740 where the controller receives a GraphQL query from a query generator. In various embodiments, the GraphQL query can be generated by the query generator based on content from a vector store and from a schema, as discussed herein.

Next, the method 700 may proceed to stage 750 where the controller receives an instruction to generate a GraphQL API client SDK from the large language model. In the example, the instructions to generate the GraphQL API client SDK include instructions to generate the GraphQL API client SDK based on the GraphQL query and based on a client type. The GraphQL query and schema received from the query generator are passed to the large language model, and the large language model generates a response including an instruction to generate the GraphQL API client SDK. For example, the LLM determines a next action as generating GraphQL client code, a tool as a GraphQL Client Generation Tool, and the tool input as the GraphQL query received at stage 740 and the client type.

The method 700 may then proceed to stage 760 where the controller receives client code in response to the GraphQL API client SDK being generated. In various embodiments, the GraphQL query and the client type are provided to a client generator or client generation tool which may generate client code based on the GraphQL query and the client type. In other words, code can be generated for a client performing the query for a particular client type. In some embodiments the client code may be generated by a large language model. However, the client code may alternatively be loaded into or from another location, such as being uploaded to or downloaded from an artifact repository or other storage location.

The method 700 then proceeds to stage 770 where the controller receives a client SDK URL converted to natural language text output from the LLM. For example, the client SDK URL can be included in a natural language message describing the client SDK and providing a hyperlink of the client SDK URL in natural language, such as the following: "The GraphQL client code in <client type> to <NL query> is available here: <client SDK URL>."

Next, the method 700 may proceed to stage 780 where the controller outputs the natural language output to the user. Once the natural language is output to the user at stage 780, the method 700 may conclude.

Figure 8:
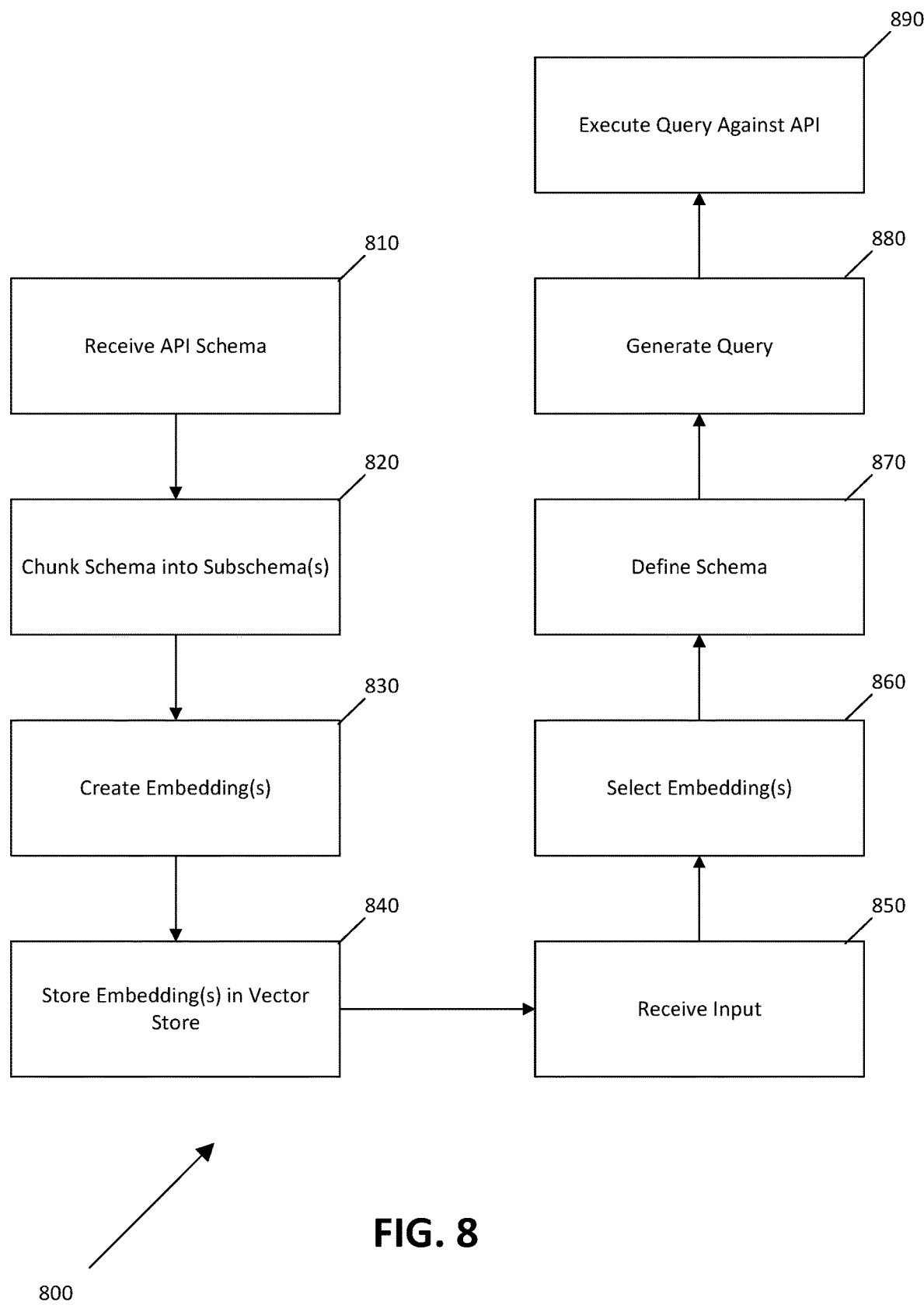
FIG. 8 illustrates example operations in which a structured query language query is executed using a natural language input, according to embodiments.

Example Operations for Executing a Structured Query Language Query Using Natural Language FIG. 8 illustrates example operations 800 for executing a structured query language query using natural language input. The operations described herein may be performed in a computing environment such as shown by FIG. 1 by a query execution system such as or similar to query execution system 110.

As illustrated, operations 800 may begin at stage 810, where an API schema is received.

Next, the method 800 may proceed to stage 820 where the API schema is chunked into one or more subschemas. The schemas may be chunked into a number of subschemas such that the subschemas will not violate a limit when used as a context for a machine learning model. GraphQL queries, or other structured queries with schemas having many associated nodes, may violate a token limit of a large language model due to having too many nodes (i.e. too high a dimensionality of retrieved vector store embeddings). Thus, a larger schema may be chunked into smaller sub schema. In cases, a schema may be represented by a DAG. In such cases, a sub schema may be represented by a branch of the DAG including one or more traversal paths from one or more leaf nodes to a root node.

Next, the method 800 may proceed to stage 830 where one or more embeddings are created. The embedding(s) may be a vector representation of subschema(s) resulting from the chunking at stage 820. The method may then proceed to stage 840 where the embedding(s) are stored in a vector store.

From stage 840 where the embedding(s) are stored, the method 800 may proceed to stage 850 where input is received. For example, a NL query input may be received from a user of a computing device in connection with an input module providing the user input to a query execution system. Next, the method 800 may proceed to stage 860 where one or more embeddings are selected. The embeddings may be selected from the vector store based on a likelihood correctness for or a similarity to the NL query input by the user.

Next, the method 800 may proceed to stage 870 where a schema is defined. In various embodiments, the one or more embeddings selected at stage 860 may be used to define a schema or sub schema for executing a GraphQL query generated from the NL query input against an API for a particular application or using a particular client type. In one embodiment, the embeddings selected from the vector store at stage 860 define traversal paths of a DAG from a root to a leaf node of the DAG. A schema (or subschema) can be defined by aggregating the nodes of the traversal paths to define a schema based on the nodes along the traversal paths.

The method may then proceed to stage 880 where a query is generated. For example, a structured query language query can be generated by providing the natural language user input query to a large language model. The large language model can also be provided a schema or subschema as a context for generating a structured query language query based on the natural language user input query and based on the schema or sub schema as context. A particular example for which a query may be generated based on natural language and a schema context is a GraphQL query being generated based on natural language and a GraphQL API schema as context.

Once the query has been generated at stage 880, the method 800 may proceed to stage 890 where the query is executed against an API. For example, a GraphQL query may be executed against a GraphQL API using an acceptable subschema and query generated by an LLM, despite the traditional problem of the schema of the GraphQL API violating a maximum token limit of the LLM, thus allowing use of generative language modeling in conjunction with GraphQL querying. Once the query is executed, the method 800 may conclude.

Figure 9:
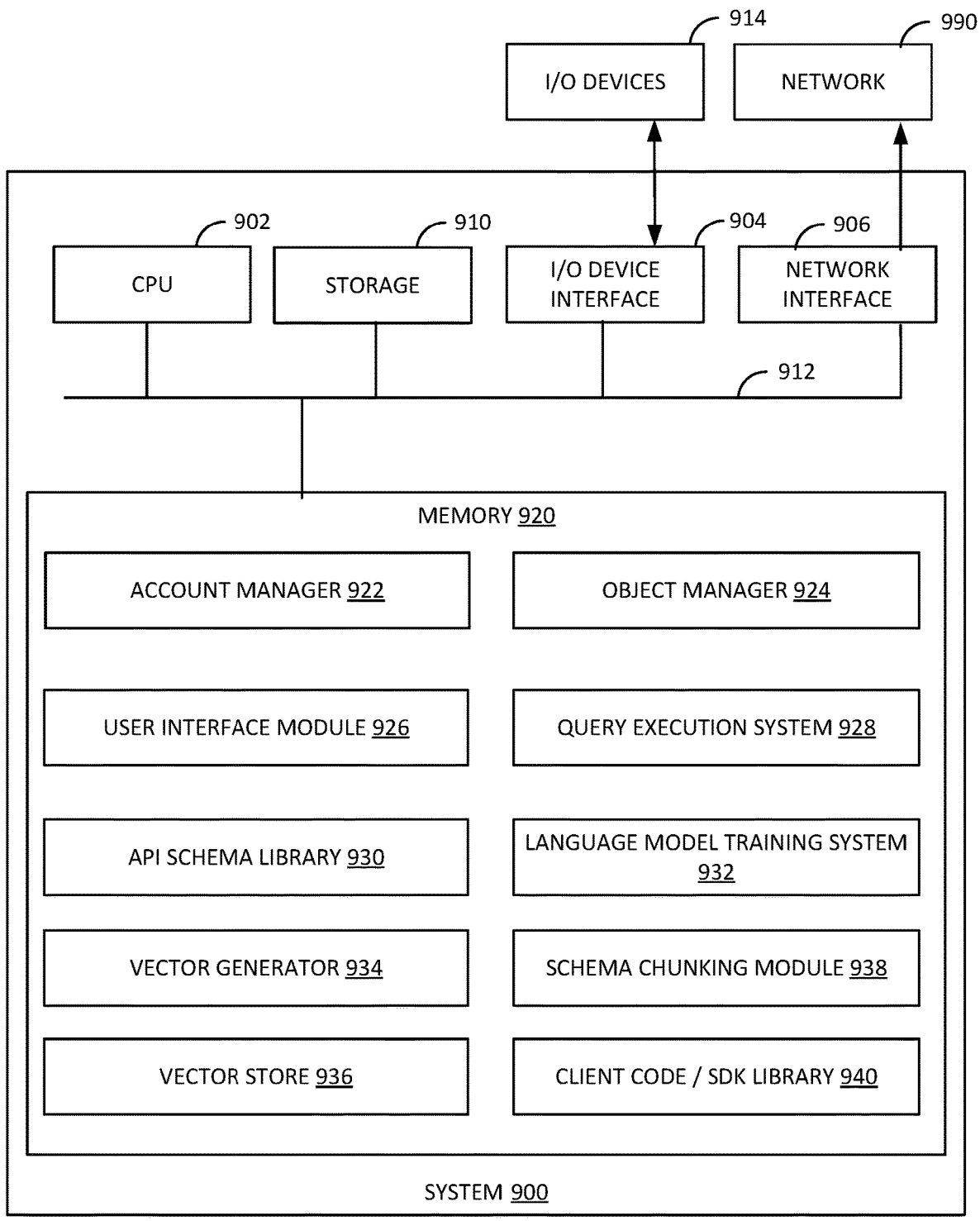
FIG. 9 illustrates an example system on which embodiments of the present disclosure can be performed, according to embodiments.

Example System for Executing a Structured Query Language Query Using Natural Language FIG. 9 illustrates an example system 900 configured to perform the methods described herein, including, for example, operations 900 of FIG. 2-8. In some embodiments, system 900 may act as a query execution system, such as query execution system 110 of computing environment 100.

As shown, system 900 includes a central processing unit (CPU) 902, one or more I/O device interfaces 904 that may allow for the connection of various I/O devices 914 (e.g., keyboards, displays, mouse devices, pen input, etc.) to the system 900, network interface 906 through which system 900 is connected to network 990 (which may be a local network, an intranet, the internet, or any other group of computing devices communicatively connected to each other), storage 910, an interconnect 912, and a memory 920. The I/O devices 914 and/or network interface 906 may be used to receive a query in a natural language utterance through a keyboard, microphone, text reader, or the like, or using a chatbot application, and may be used to output a response to the query. The response to the query may be generated based on extracting operators and operands from the natural language utterance. In some embodiments, the storage 920 may be external storage and the network interface 906 is also used to connect to the external storage.

CPU 902 may retrieve and execute programming instructions stored in the memory 908. Similarly, the CPU 902 may retrieve and store application data residing in the storage 910 and/or memory 920. The interconnect 912 transmits programming instructions and application data, among the CPU 902, I/O device interface 904, network interface 906, and memory 920.

CPU 902 is included to be representative of a single CPU, multiple CPUs, a single CPU having multiple processing cores, and the like.

Memory 920 is representative of a volatile memory, such as a random access memory, or a nonvolatile memory, such as nonvolatile random access memory, phase change random access memory, or the like. As shown, memory 920 includes an account manager 922, an object manager 924, a user interface module 926, a query execution system 928, an API schema library 930, a language model training system 932, a vector generator 934, a vector store 936, a schema chunking module 938, and a client SDK library 940.

Account manager 922 may be used to manage accounts associated with the system 900. For example, users of a query execution system may have accounts or profiles associated therewith. Object manager 924 may be used to manage objects associated with the system 900. For example, queries, query results, user histories, or the like may be managed by the object manager 924 and/or associated by the object manager 924 with one or more accounts managed by the account manager 922.

User interface module 926 enables interfacing between the I/O device interface and other devices of the system. For example, the UI module 926 can generate graphical user interfaces for an I/O device interface 904 and/or accept keyboard and mouse commands from the I/O device interface 904.

The query execution system 928 of some embodiments may be similar to or the same as the query execution system 110 of FIG. 1. The query execution system can receive natural language input, execute a GraphQL query associated with the input, and output natural language results including converted results of executing the GraphQL query in the natural language output.

The API schema library 930 can maintain can maintain a library of schemas or subschemas, such as schemas or subschemas associated with one or more GraphQL APIs or other schemas (or subschemas).

The language model training system 932 includes modules for collecting training data and training a language model. The language model training system 932 uses the training data and the training module to train or fine-tune a language model to generate structured query language queries, such as GraphQL queries, using a natural language input and a schema (or subschema) as context.

The vector generator 934 of certain embodiments creates vectorized embeddings based on subschemas generated from the schema chunking module 938 by chunking a schema for a GraphQL API into subschemas used as a basis for the embeddings. The embeddings are stored in vector store 936, and selectively retrieved by the query execution system 928 in response to associations between chunks and natural language input into the query execution system 928.

In embodiments where client code for a GraphQL API client is generated, and/or in which a client SDK is generated, the GraphQL API client code and/or the client SDK may be stored in a repository or library, such as client code/SDK library 940. In some cases, the library 940 may include URLs providing the location of the client code or SDK.

It is noted that the system 900 is exemplary in nature and that items depicted in memory 920 may be omitted, located external to memory 920, or otherwise configured. Other modules may also be included memory 220 or connected via the network interface 906. It is further anticipated that features of the various modules and systems described herein may be separated, combined, or otherwise configured, and that modules may be added or removed, without departing from the scope of this disclosure.

Example Clauses

Aspect 1: A method of executing a structured query language query, comprising: receiving a structured query language schema executable against an application programming interface; chunking the structured query language schema into a plurality of sub schemas; creating a plurality of embeddings for the plurality of sub schemas; storing the plurality of embeddings in a vector store; receiving a NL query; selecting at least one embedding related to the NL query from the vector store; defining a subschema from the at least one embedding; generating, using a large language model trained to generate structured query language queries based on natural language input and an input schema, the structured query language query based on the NL query and the subschema; and executing the structured query language query against the application programming interface.

Aspect 2: The method of Aspect 1, wherein defining the subschema from the at least one embedding comprises: selecting a plurality of leaf nodes of the vector store based on the at least one embedding; determining, using the structured query language schema, a traversal path from at least one of the plurality of leaf nodes to a root node of the vector store, the traversal path including a plurality of nodes along the traversal path; and storing the plurality nodes along the traversal path as the subschema.

Aspect 3: The method of any of aspects 1-2, wherein: the structured query language query is a GraphQL query and the application programming interface (API) is a GraphQL API.

Aspect 4: The method of any of aspects 1-3, further comprising: defining a GraphQL toolkit comprising a plurality of tools and having machine-readable metadata defining a plurality of uses for the plurality of tools.

Aspect 5: The method of any of aspects 1-4, further comprising: generating a client software development kit for the structured query language query.

Aspect 6: The method of any of aspects 1-5, wherein: the application programming interface conforms to a machine-readable schema definition language.

Aspect 7: The method of any of aspects 1-6, further comprising: generating client source code for the structured query language query.

Aspect 8: A system comprising: a memory having executable instructions stored thereon; and one or more processors configured to execute the executable instructions to cause the system to execute a structured query language query by causing the system to: receive a structured query language schema executable against an application programming interface; chunk the structured query language schema into a plurality of subschemas; create a plurality of embeddings for the plurality of sub schemas; store the plurality of embeddings in a vector store; receive a NL query; select at least one embedding related to the NL query from the vector store; define a sub schema from the at least one embedding; generate, using a large language model trained to generate structured query language queries based on natural language input and an input schema, the structured query language query based on the NL query and the subschema; and execute the structured query language query against the application programming interface.

Aspect 9: The system of aspect 8, wherein defining the subschema from the at least one embedding comprises: selecting a plurality of leaf nodes of the vector store based on the at least one embedding; determining, using the structured query language schema, a traversal path from at least one of the plurality of leaf nodes to a root node of the vector store, the traversal path including a plurality of nodes along the traversal path; and storing the plurality nodes along the traversal path as the sub schema.

Aspect 10: The system of any of aspects 8-9, wherein: the structured query language query is a GraphQL query and the application programming interface (API) is a GraphQL API.

Aspect 11: The system of any of aspects 8-10, wherein the one or more processors are configured to execute the structured query language query by further causing the system to: define a GraphQL toolkit comprising a plurality of tools and having machine-readable metadata defining a plurality of uses for the plurality of tools.

Aspect 12: The system of any of aspects 8-11, wherein the one or more processors are configured to execute the structured query language query by further causing the system to: generate a client software development kit for the structured query language query.

Aspect 13: The system of any of aspects 8-12, wherein: the application programming interface conforms to a machine-readable schema definition language.

Aspect 14: The system of any of Aspects 8-13, wherein the one or more processors are configured to execute the structured query language query by further causing the system to: generate client source code for the structured query language query.

Aspect 15: A non-transitory computer readable storage medium comprising instructions, that when executed by one or more processors of a computing system, cause the computing system to: receive a structured query language schema executable against an application programming interface; chunk the structured query language schema into a plurality of sub schemas; create a plurality of embeddings for the plurality of sub schemas; store the plurality of embeddings in a vector store; receive a NL query; select at least one embedding related to the NL query from the vector store; define a subschema from the at least one embedding; generate, using a large language model trained to generate structured query language queries based on natural language input and an input schema, the structured query language query based on the NL query and the subschema; and execute the structured query language query against the application programming interface.

Aspect 16: The non-transitory computer readable storage medium of aspect 15, wherein defining the subschema from the at least one embedding comprises: selecting a plurality of leaf nodes of the vector store based on the at least one embedding; determining, using the structured query language schema, a traversal path from at least one of the plurality of leaf nodes to a root node of the vector store, the traversal path including a plurality of nodes along the traversal path; and storing the plurality nodes along the traversal path as the subschema.

Aspect 17: The non-transitory computer readable storage medium of any of aspects 15-16, wherein: the structured query language query is a GraphQL query and the application programming interface (API) is a GraphQL API.

Aspect 18: The non-transitory computer readable storage medium of any of aspects 15-17, wherein the one or more processors are configured to execute the structured query language query by further causing the system to: define a GraphQL toolkit comprising a plurality of tools and having machine-readable metadata defining a plurality of uses for the plurality of tools.

Aspect 19: The non-transitory computer readable storage medium of any of aspects 15-18, wherein the one or more processors are configured to execute the structured query language query by further causing the system to: generating a client software development kit for the structured query language query; and generate client source code for the structured query language query.

Aspect 20: The non-transitory computer readable storage medium of any of aspects 15-19, wherein: the application programming interface conforms to a machine-readable schema definition language.

Additional Considerations

The preceding description is provided to enable any person skilled in the art to practice the various embodiments described herein. Various modifications to these embodiments will be readily apparent to those skilled in the art, and the generic principles defined herein may be applied to other embodiments. For example, changes may be made in the function and arrangement of elements discussed without departing from the scope of the disclosure. Various examples may omit, substitute, or add various procedures or components as appropriate. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

A processing system may be implemented with a bus architecture. The bus may include any number of interconnecting buses and bridges depending on the specific application of the processing system and the overall design constraints. The bus may link together various circuits including a processor, machine-readable media, and input/output devices, among others. A user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer-readable medium. Software shall be construed broadly to mean instructions, data, or any combination thereof, whether referred to as software, firmware, middleware, microcode, hardware description language, or otherwise. Computer-readable media include both computer storage media and communication media, such as any medium that facilitates transfer of a computer program from one place to another. The processor may be responsible for managing the bus and general processing, including the execution of software modules stored on the computer-readable storage media. A computer-readable storage medium may be coupled to a processor such that the processor can read information from, and write information to, the storage medium. In the alternative, the storage medium may be integral to the processor. By way of example, the computer-readable media may include a transmission line, a carrier wave modulated by data, and/or a computer readable storage medium with instructions stored thereon separate from the wireless node, all of which may be accessed by the processor through the bus interface. Alternatively, or in addition, the computer-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module, it will be understood that such functionality is implemented by the processor when executing instructions from that software module.

The following claims are not intended to be limited to the embodiments shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method of executing a structured query language query, comprising:
    receiving a structured query language schema executable against an application programming interface and a natural language (NL) query;
    creating a plurality of embeddings for a plurality of subschemas defined for chunks of the structured query language schema;
    storing the plurality of embeddings in a vector store;
    selecting an embedding related to the NL query from the vector store;
    defining a subschema from the embedding by:
        selecting a leaf node of the vector store based on the embedding;
        determining, using the structured query language schema, a traversal path including a plurality of nodes from the leaf node to a root node of the vector store; and
        storing the plurality of nodes as the subschema;
    generating, using a large language model trained to generate structured query language queries based on natural language input and an input schema, the structured query language query based on the NL query and the subschema; and
    executing the structured query language query against the application programming interface.

2. The method of claim 1, wherein defining the subschema from the embedding comprises:
    selecting a plurality of leaf nodes of the vector store based on a plurality of embeddings;
    determining, using the structured query language schema, the traversal path from at least one of the plurality of leaf nodes to the root node of the vector store.

3. The method of claim 1, wherein:
    the structured query language query is a GraphQL query and the application programming interface (API) is a GraphQL API.

4. The method of claim 3, further comprising:
    defining a GraphQL toolkit comprising a plurality of tools and having machine-readable metadata defining a plurality of uses for the plurality of tools.

5. The method of claim 1, further comprising:
    generating a client software development kit for the structured query language query.

6. The method of claim 1, wherein:
    the application programming interface conforms to a machine-readable schema definition language.

7. The method of claim 1, further comprising:
    generating client source code for the structured query language query.

8. A system comprising:
    a memory having executable instructions stored thereon; and
    one or more processors configured to execute the executable instructions to cause the system to execute a structured query language query by causing the system to:
    receive a structured query language schema executable against an application programming interface and a natural language (NL) query;
    create a plurality of embeddings for a plurality of subschemas defined for chunks of the structured query language schema;
    store the plurality of embeddings in a vector store;
    select an embedding related to the NL query from the vector store;

define a subschema from the embedding by:
    selecting a leaf node of the vector store based on the embedding;
    determining, using the structured query language schema, a traversal path including a plurality of nodes from the leaf node to a root node of the vector store; and
    storing the plurality of nodes as the subschema;
generate, using a large language model trained to generate structured query language queries based on natural language input and an input schema, the structured query language query based on the NL query and the subschema; and
execute the structured query language query against the application programming interface.

9. The system of claim 8, wherein defining the sub schema from the embedding comprises:
    selecting a plurality of leaf nodes of the vector store based on a plurality of embeddings;
    determining, using the structured query language schema, the traversal path from at least one of the plurality of leaf nodes to the root node of the vector store.

10. The system of claim 8, wherein:
    the structured query language query is a GraphQL query and the application programming interface (API) is a GraphQL API.

11. The system of claim 10, wherein the one or more processors are configured to execute the structured query language query by further causing the system to:
    define a GraphQL toolkit comprising a plurality of tools and having machine-readable metadata defining a plurality of uses for the plurality of tools.

12. The system of claim 8, wherein the one or more processors are configured to execute the structured query language query by further causing the system to:
    generate a client software development kit for the structured query language query.

13. The system of claim 8, wherein:
    the application programming interface conforms to a machine-readable schema definition language.

14. The system of claim 8, wherein the one or more processors are configured to execute the structured query language query by further causing the system to:
    generate client source code for the structured query language query.

15. A non-transitory computer readable storage medium comprising instructions, that when executed by one or more processors of a computing system, cause the computing system to:
    receive a structured query language schema executable against an application programming interface and a natural language (NL) query;
    create a plurality of embeddings for a plurality of subschemas defined for chunks of the structured query language schema;
    store the plurality of embeddings in a vector store;
    select an embedding related to the NL query from the vector store;
    define a subschema from the embedding by:
        selecting a leaf node of the vector store based on the embedding;
        determining, using the structured query language schema, a traversal path including a plurality of nodes from the leaf node to a root node of the vector store; and
        storing the plurality of nodes as the subschema;
    generate, using a large language model trained to generate structured query language queries based on natural language input and an input schema, the structured query language query based on the NL query and the subschema; and
    execute the structured query language query against the application programming interface.

16. The non-transitory computer readable storage medium of claim 15, wherein defining the subschema from the embedding comprises:
    selecting a plurality of leaf nodes of the vector store based on a plurality of embeddings;
    determining, using the structured query language schema, the traversal path from at least one of the plurality of leaf nodes to the root node of the vector store.

17. The non-transitory computer readable storage medium of claim 15, wherein:
    the structured query language query is a GraphQL query and the application programming interface (API) is a GraphQL API.

18. The non-transitory computer readable storage medium of claim 17, wherein the one or more processors are configured to execute the structured query language query by further causing the system to:
    define a GraphQL toolkit comprising a plurality of tools and having machine-readable metadata defining a plurality of uses for the plurality of tools.

19. The non-transitory computer readable storage medium of claim 15, wherein the one or more processors are configured to execute the structured query language query by further causing the system to:
    generating a client software development kit for the structured query language query; and
    generate client source code for the structured query language query.

20. The non-transitory computer readable storage medium of claim 15, wherein:
    the application programming interface conforms to a machine-readable schema definition language.

* * * * *